US005217769A

United States Patent [19]

Harris et al.

[11] Patent Number: 5,217,769

[45] Date of Patent: Jun. 8, 1993

[54] TUBULAR WOVEN FABRIC COMPRISING PVA WARP YARNS

[75] Inventors: Philip G. Harris, Spartanburg, S.C.; Tom M. Reid, Thomson, Ga.

[73] Assignee: Milliken Research Corporation, Spartanburg, S.C.

[21] Appl. No.: 610,688

[22] Filed: Nov. 8, 1990

[51] Int. Cl.[5] ........................ D03D 3/02; B32B 23/02; B29D 22/00

[52] U.S. Cl. ...................................... 428/36.1; 28/168; 139/387 R; 428/64; 428/66; 428/192; 428/193; 428/224; 428/225; 428/229; 428/908; 428/913

[58] Field of Search ....................... 428/36.1, 121, 193, 428/913, 64, 66, 192, 229, 225, 224, 908; 139/387 R; 28/168

[56] References Cited

U.S. PATENT DOCUMENTS

| | | | |
|---|---|---|---|
| 3,596,386 | 8/1971 | Zapater | 223/69 |
| 3,908,250 | 9/1975 | Agan, Jr. et al. | 34/41 |
| 4,188,983 | 2/1980 | Graham et al. | 220/490 |
| 4,191,218 | 3/1980 | Clark et al. | 28/155 |
| 4,371,415 | 2/1983 | Tanaka | 156/441 |
| 4,497,095 | 2/1985 | Minemura et al. | 28/160 |
| 4,531,386 | 7/1985 | England et al. | 66/190 |
| 4,838,046 | 6/1989 | Yasukawa | 66/194 |
| 4,858,245 | 8/1989 | Sullivan et al. | 2/21 |
| 4,925,803 | 5/1990 | Suehiro et al. | 435/182 |
| 5,066,363 | 11/1991 | Lee et al. | 428/913 |

FOREIGN PATENT DOCUMENTS 60-215868 10/1985 Japan .

*Primary Examiner*—Jenna L. Davis
*Assistant Examiner*—James D. Withers
*Attorney, Agent, or Firm*—Terry T. Moyer; Earle R. Marden

[57] ABSTRACT

The method of providing an impression fabric in which the fill yarns do not protrude from the plane of the fabric. The impression fabric is a tubular woven fabric in which a plurality of warp yarns is woven in one edge thereof and dissolved by washing after the fabric has been formed.

2 Claims, 1 Drawing Sheet

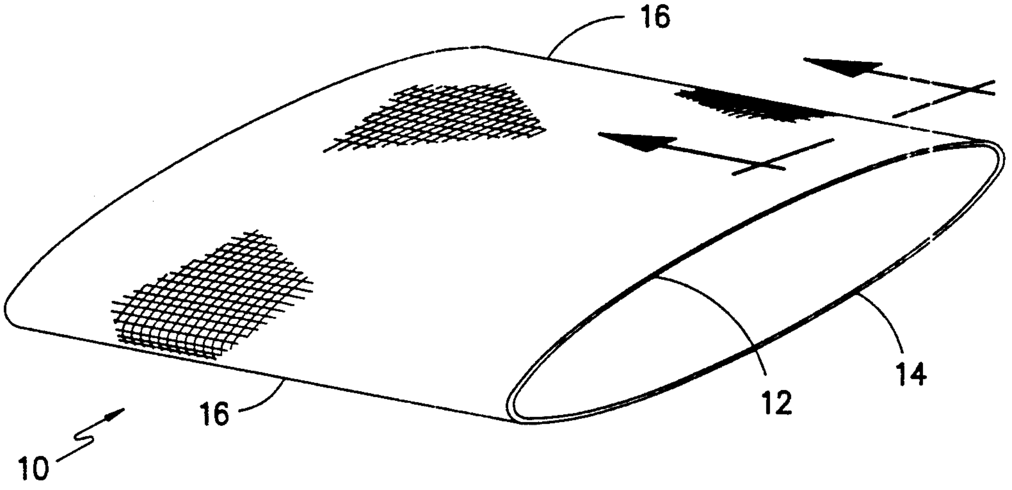
FIG. –1–
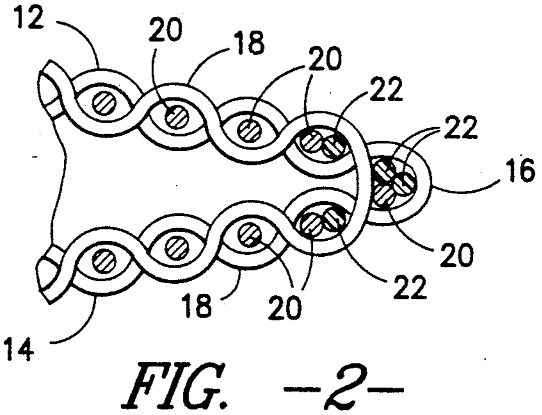
FIG. –2–
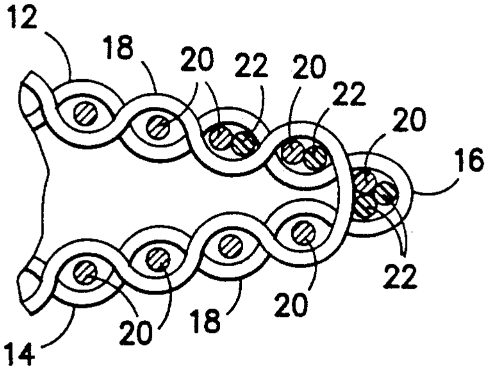
FIG. –3–
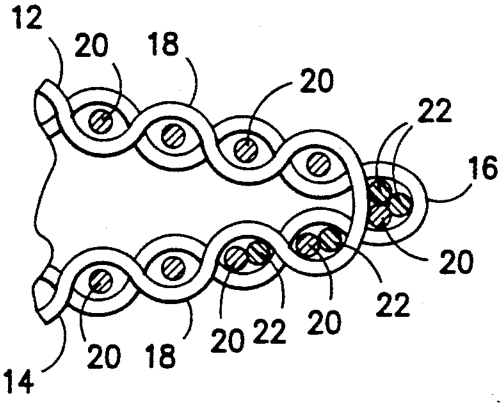
FIG. –4–

TUBULAR WOVEN FABRIC COMPRISING PVA WARP YARNS

This invention relates to a tubular woven fabric, referred to as an impression fabric, which is used as a printing ribbon and has good print quality, long print life and less tendency to be snarled by the print head reducing the number of cartridge failings.

Tubular woven fabrics have been employed as impression fabric in the past but it has been found that on some looms the warp ends of yarn at the edges of the fabric where the shuttle changes direction tend to close together causing what is referred to as crowded ends. These crowded ends cause the filling yarn to protrude out of the plane of the fabric at the point where the upper and lower sheets of the tube are formed. This protrusion can be 1 to 2 mils thicker than the body of the fabric resulting in interference between the fabric and the print head resulting in early failure of the cartridge in which the fabric is housed for use.

It is therefore an object of this invention to provide a method to produce tubular woven fabric which lessens and/or eliminates the production of crowded ends at the turn around points of the fabric.

Other objects and advantages of the invention will become readily apparent as the specification proceeds to describe the invention with reference to the accompanying drawings, in which: FIG. 1 is a tubular woven impression fabric for use in a cartridge;

FIG. 2 is a cross-sectional view taken on line 2—2 of FIG. 1 showing the weave construction, and FIGS. 3 and 4 are variations of the fabric shown in FIGS. 1 and 2.

In normal operation the tubular fabric 10 is a 12 harness dobby plain weave with each sheet of fabric 12 or 14 controlled by six (6) harnesses. For example, the top sheet 12 of fabric 10 is controlled by harnesses 1, 3, 5, 7, 9 and 11 while the lower sheet 14 is controlled by harnesses 2, 4, 6, 8, 10 and 12. With the harnesses crossing at each pick so that the harness motion required to weave the tubular fabric is four (4) picks of the loom. As an example of harness motion the following depicts the preferred harness motion to produce the tubular fabric 10:

| PICK | HARNESSES UP AND DOWN | ACTION |
|---|---|---|
| 1 | U - 1,3,4,5,7,8,9,11,12<br>D - 2,6,10 | TOP SHEET UP AND OUT OF WAY, 1 PICK PUT IN BOTTOM SHEET |
| 2 | U - 3,7,11<br>D - 1,2,4,5,6,8,9,10,12 | BOTTOM SHEET DOWN AND OUT OF WAY, 1 PICK PUT IN TOP SHEET |
| 3 | U - 1,2,3,5,6,7,9,10,11<br>D - 4,8,12 | TOP SHEET UP AND OUT OF WAY, 1 PICK PUT IN BOTTOM SHEET |
| 4 | U - 1,5,9<br>D - 2,3,4,6,7,8,10,11,12 | BOTTOM SHEET DOWN AND OUT OF WAY, 1 PICK PUT IN TOP SHEET |

The alternates of the picks in the top and bottom sheets cause the top sheet 12 and the bottom sheet 14 to be connected together at the ends 16.

As previously indicated the warp yarns 20 at the edge 16 of the tubular woven fabric 10 tend to crowd one another and cause the fill yarns 18 to protrude above the surface of the fabric. In the preferred form of the invention the warp yarns 20 are 40 denier, 34 filament 6,6 nylon but to alleviate the protrusion problem four warp yarns 22 of 45 denier water soluble monofilament polyvinyl alcohol (PVA) are used in the loom to be placed in the ends 16 of the tubular fabric 10. For reasons unexplained the right hand side of the fabric has a greater tendency to protrude than the left hand side of the fabric as it comes off the loom so the PVA yarn is used only in the right hand edge 16 of the fabric but can be used on both ends of the fabric 10. Then, when the fabric 10 is washed after weaving the water soluble PVA yarns will dissolve thereby alleviating the tendency of the fill yarn 18 to be pushed upwardly by the crowded ends.

FIGS. 2-4 illustrate the various positions in which the PVA yarn 22 can be woven into the fabric. In FIG. 2 the fabric 10 is balanced while in FIG. 3 the majority of the PVA yarns is in the top sheet 12. In FIG. 4 the majority of the PVA yarns is in the bottom sheet 14. The position of the PVA yarns in the edges 16 of the tubular woven fabric 10 depends on where the greatest distortion of the fill yarn occurs.

In normal operation the tubular fabric 10 is woven, taken up on a take up roll and then finished. During the finishing operation the fabric 10 is washed to dissolve the PVA yarns. After the fabric 10 is finished it is cut in the fill yarn direction with a hot knife to the desired width for use as an endless inking tape or ribbon.

It can be seen that the use of PVA yarns in the edges of a tubular woven fabric allows the fabric to be flattened out after washing and drying to eliminate or lessen the crowded ends which cause the fill yarn to protrude above the surface of the tubular woven fabric. When the PVA yarn has been dissolved there is no yarn available to push the fill yarn in the upward direction.

Although the preferred embodiments of the invention have been described specially, it is contemplated that changes may be made without departing from the scope or spirit of the invention and it is desired that the invention be limited only by the claims.

We claim:

1. An impression fabric comprising: a tubular woven fabric having an upper sheet and a lower sheet, said upper sheet and said lower sheet having end portions connected to one another on both extremities of said sheets turning said tubular woven fabric, at least one of said end portions having polyvinyl alcohol warp yarns therein.

2. The fabric of claim 1 wherein there are at least four polyvinyl alcohol warp yarns in said one end portion.

* * * * *

UNITED STATES PATENT AND TRADEMARK OFFICE

CERTIFICATE OF CORRECTION

PATENT NO. : 5,217,769

DATED : June 8, 1993

INVENTOR(S) : Philip G. Harris and Tom M. Reid

It is certified that error appears in the above-identified patent and that said Letters Patent is hereby corrected as shown below:

Column 2, line 59, delete "turning" and insert --forming--

Signed and Sealed this

Eighteenth Day of January, 1994

Attest:

Bruce Lehman

BRUCE LEHMAN

*Attesting Officer*

*Commissioner of Patents and Trademarks*